United States Patent
Naghski

(10) Patent No.: US 6,386,767 B1
(45) Date of Patent: May 14, 2002

(54) HIGH DENSITY MULTIPLE CHIP FIBER ARRAY CONNECTOR

(75) Inventor: David Naghski, Lewisberry, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 09/476,666

(22) Filed: Dec. 30, 1999

(51) Int. Cl.[7] .................................................. G02B 6/38
(52) U.S. Cl. ............................ 385/59; 385/65; 385/52; 385/83
(58) Field of Search .............................. 385/53, 54, 59, 385/55, 60, 65, 77, 78, 83, 52, 139, 114

(56) References Cited

U.S. PATENT DOCUMENTS

| | | | |
|---|---|---|---|
| 3,864,018 A | | 2/1975 | Miller ........................ 350/96 C |
| 4,046,454 A | | 9/1977 | Pugh, III .................... 350/96 C |
| 4,657,341 A | * | 4/1987 | Sammueller .............. 385/65 X |
| 4,818,058 A | | 4/1989 | Bonanni .................... 350/96.2 |
| 4,836,638 A | * | 6/1989 | Finzel ........................ 385/65 X |
| 5,016,972 A | * | 5/1991 | Schlaak ..................... 385/65 X |
| 5,315,678 A | * | 5/1994 | Maekawa et al. .............. 385/59 |
| 5,379,361 A | | 1/1995 | Maekawa et al. .............. 385/65 |
| 5,483,611 A | | 1/1996 | Basavanhally ................ 385/78 |
| 5,620,634 A | | 4/1997 | Shahid ........................ 264/1.25 |
| 5,689,599 A | | 11/1997 | Shahid .......................... 385/83 |
| 5,737,463 A | | 4/1998 | Weiss et al. ................... 385/59 |
| 5,896,479 A | | 4/1999 | Vladic .......................... 385/59 |

* cited by examiner

*Primary Examiner*—Brian Healy
(74) *Attorney, Agent, or Firm*—Woodcock Washburn LLP

(57) ABSTRACT

A high density multiple chip fiber array connector having a ferrules located by alignment chips within the connector. The ferrules each contain an array of optical fibers and have grooves on opposing ends that cooperate with ridges formed on said alignment chips to locate the ferrules within the connector. Alignment pins are provide at opposing end of the alignment chips to position the connector with respect to a complementary connector when mated thereto. The connector is fabricated by bonding the ferrules, alignment chips and alignment pins together and then placing these components within a housing.

23 Claims, 3 Drawing Sheets

HIGH DENSITY MULTIPLE CHIP FIBER ARRAY CONNECTOR

FIELD OF THE INVENTION

The present invention relates to electrical connectors. More particularly, the present invention is directed to a fiber optic interconnect system that utilizes alignment chips to position a plurality of stacked ferrules in order to align optical fiber arrays.

BACKGROUND OF THE INVENTION

As fiber optic waveguides overtake copper transmission wires as the preferred method of transmitting information, the methods and systems for interconnecting fiber waveguides continue to evolve. Glass fiber interconnection techniques are significantly more demanding than copper wire connectors due in part to the requirement that glass fibers must be connected end to end, and connected with a precision sufficient to exactly align very small fiber waveguide cores to within a few microns, and often within a fraction of a micron. Because fiber waveguides are capable of carrying enormous quantities of information as compared to copper wires, typically, only a relatively few number of fibers are required to match or even exceed the capacity of large bundles of wires in copper cables. However, with the increasing capacity demanded by current and future data and multimedia transmission networks, the number of fibers in a single transmission cable continues to grow.

The end-to-end high precision connection requirement of fiber waveguides precludes simply bundling of large numbers of individual fibers in a cable as was the practice with copper wires. Instead the fibers are organized in a high precision, fixed, spatial relation. A common approach for such arrays are ribbon cables in which a plurality of fibers are organized and molded side by side in a plastic ribbon. Alignment of optical fiber arrays either with other arrays or with optical components is troublesome, especially for the case of single mode fibers which have an extremely small core diameter (typically approximately 9 $\mu$m). A typical connector for fiber arrays includes two ferrules or plugs of silicon with grooves formed therein for accommodating the fibers (e.g., 18 optical fibers). Each plug is formed from two mated members which are bonded together to encase the fibers. The grooves are formed prior to bonding by anisotropically etching a major surface of each member in an array corresponding to the fibers so that when the members are bonded, each fiber lies in a groove which is precisely aligned with all other fibers in the array. However, while the fibers within a plug may be fairly closely aligned with each other, a problem exists in aligning these fibers with another fiber array or with an array of optical components.

While ribbon connectors are capable of very high transmission capacities there is a need for even greater capacity. An approach for addressing this is to stack fiber waveguide ribbons. The interconnection for such stacked arrays requires a similarly stacked connector, which presents new problems in precisely aligning the fiber waveguides in the added or stacking dimension. Typically, an alignment member is provided between the stacked ribbons in order to maintain fiber-to-fiber alignment. However, this approach increases the size of the connector because of the space required for the alignment member. This approach also increases the number and complexity of interconnecting elements between complementary connectors, as several alignment members must mate as the connectors are joined. While this structure is known, precision alignment of fibers remains an issue, especially as the size and complexity of the connectors grows.

It would, therefore, be desirable to reduce the space required by the optical fiber connector, while also increasing the density of connection points. There is also a need for a high density optical fiber connector that provides for improved precision in the alignment of the fibers, while also reducing the fiber-to-fiber distance. The present invention provides such a solution.

SUMMARY OF THE INVENTION

In accordance with an aspect of the present invention, there is provided an optical connector that includes alignment chips provided on opposing sides of the connector, a ferrule mounted between the alignment chips and alignment pins.

In accordance with a feature of the invention, the optical connector further includes a housing, and the alignment chips, the alignment pins and the ferrule are contained withing the housing. The housing may include generally parallel ribs and the alignment chips may include generally parallel grooves that cooperate with the ribs to secure the alignment chips within the housing. The ribs may have a cross-sectional shape of a truncated cone.

In accordance with another feature, each of the alignment chips has a ridge formed on a wall thereof, and the ferrule has v-grooves provided on opposing ends thereof that cooperate with the ridges to position the ferrule within the connector. Also, the alignment chips may include a plurality of regularly spaced ridges such that a plurality of ferrules may be aligned within the connector. The alignment chips may be made of silicon and the ridge may be formed having a cross-sectional shape of a truncated cone.

In accordance with yet another feature, the ferrule comprises two like silicon members, each of the like members having v-grooves etched therein to position a plurality of optical fibers. The like members each have angled edges that form the ferrules v-grooves.

In accordance with still another feature, the alignment pins position the connector with respect to a complementary connector when mated thereto. The alignment pins may be positioned in planes generally parallel to the ferrule and fabricated as a section of a cylinder such that edges of the alignment pins have a circular arc.

In accordance with another aspect of the invention, there is provided a multiple array optical connector that includes an outer housing, a pair of generally parallel alignment chips provided on opposing inside surfaces of the outer housing, a plurality of ferrules mounted in perpendicular planes to the pair of alignment chips, and alignment pins provided at opposing ends of the pair of alignment chips.

In accordance with a feature of the invention, the housing includes generally parallel ribs and each of the pair of alignment chips includes generally parallel grooves that cooperate with the generally parallel ribs to locate the pair alignment chips in the housing.

In accordance with another feature, each of the alignment chips includes a plurality of regularly spaced ridges, and each of the plurality of ferrules includes grooves provided on opposing ends thereof that cooperate with the ridges to position the plurality of ferrules within the connector.

In accordance with yet another aspect of the invention, there is provided a connector for connecting multiple arrays of optical fibers arranged in generally parallel planes. The connector includes a plurality of ferrules each containing an array of optical fibers, alignment chips that position the plurality of ferrules within the connector, and alignment pins that position the connector with respect to a complementary connector.

In accordance with a feature of the invention, the ferrules and the alignment chips are made of silicon, and the ridges and the grooves are formed by an etching process.

In accordance with another feature of the invention, the alignment pins are positioned in planes generally parallel to the plurality of ferrules, and the alignment pins position the connector with respect to a complementary connector when mated thereto.

Other features will be described herein.

DETAILED DESCRIPTION OF THE PREFERRED EMBODIMENTS

Figure 1:
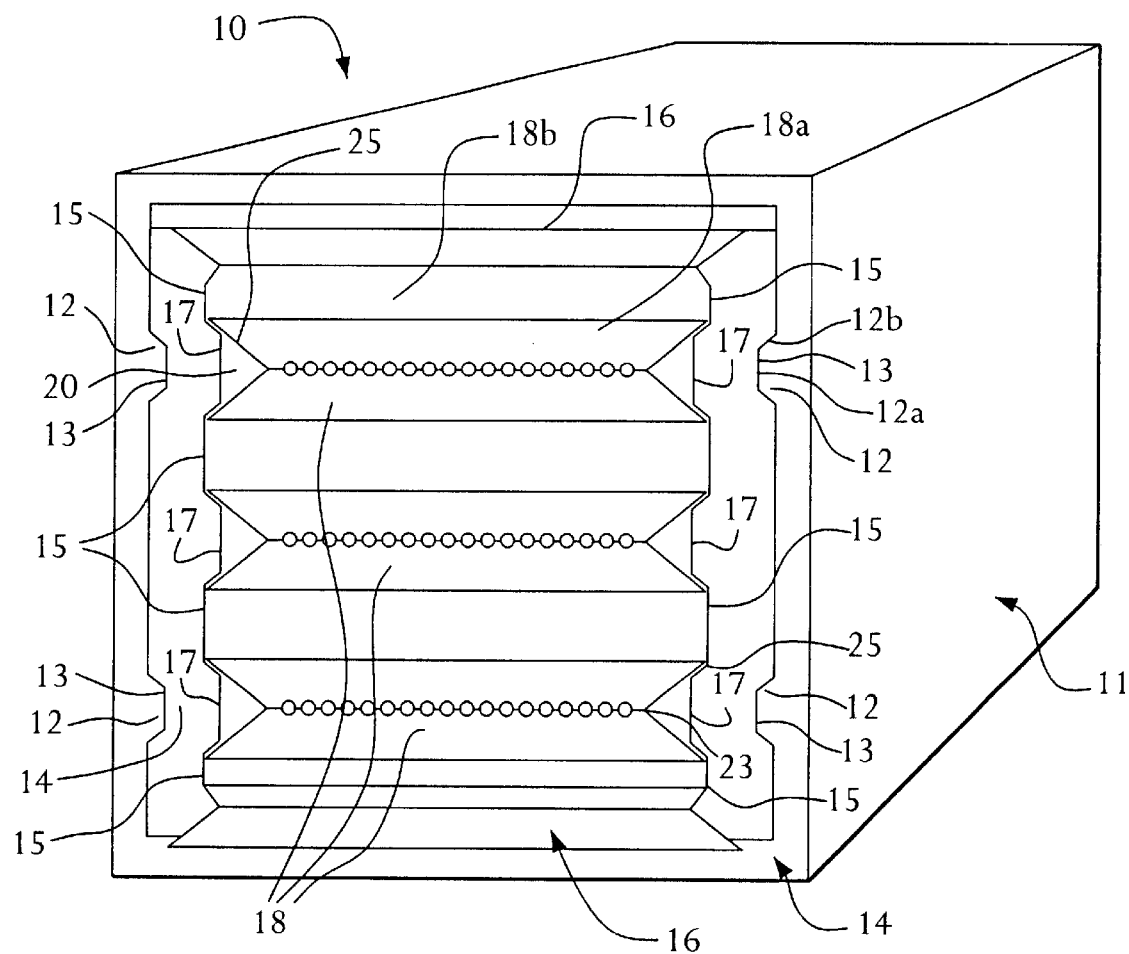
FIG. 1 is a perspective view of the fiber array connector of the present invention.
Figure 2:
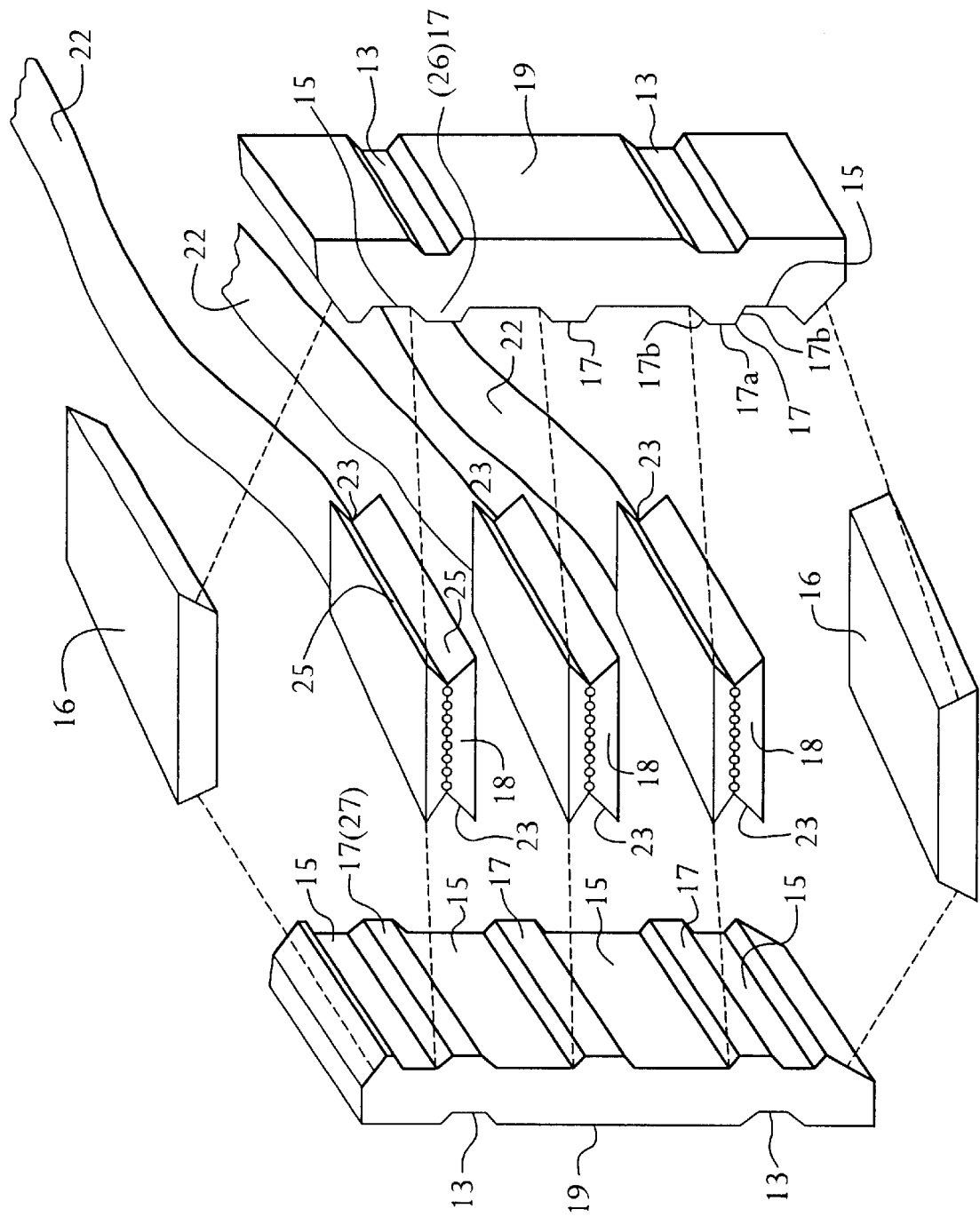
FIG. 2 is an exploded view of the internal components of the fiber array connector.
Figure 3:
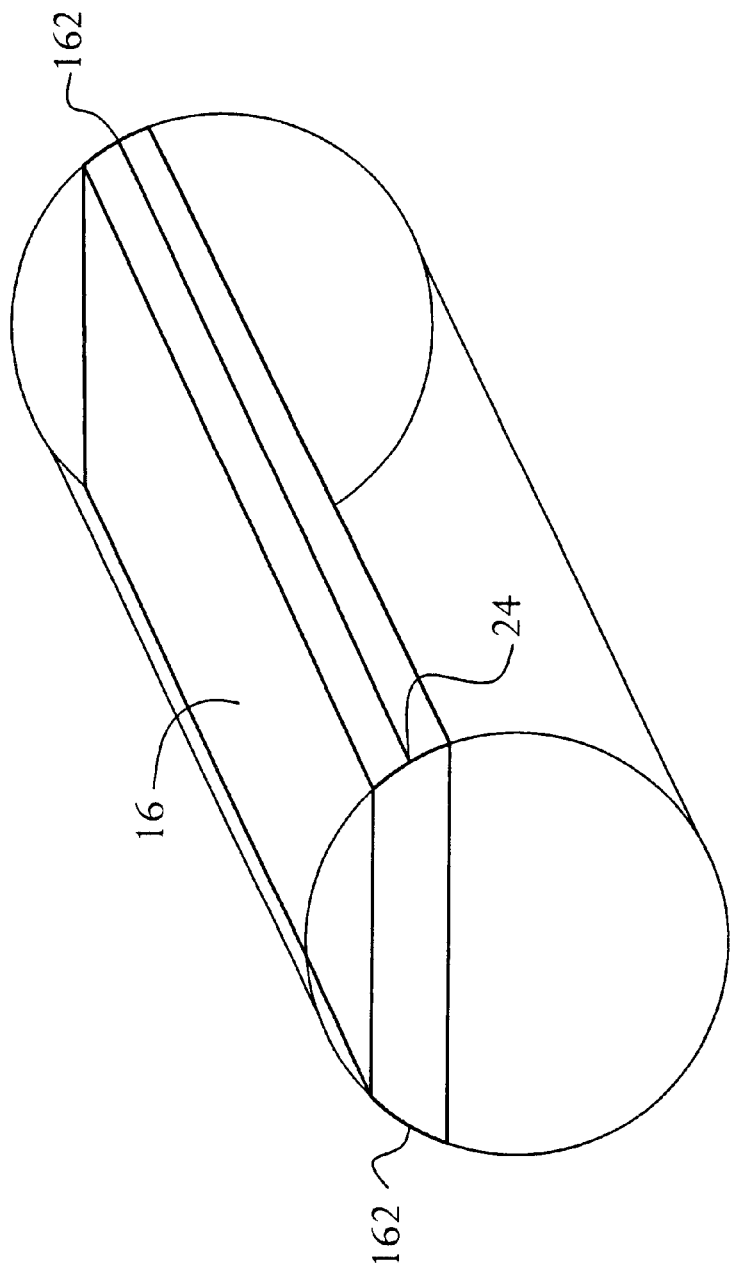
FIG. 3 is a perspective view of a connection alignment pin.

The present invention has applicability to devices for interconnecting and aligning optical fibers. Referring to FIGS. 1–3, there is illustrated an exemplary embodiment of a high density multiple chip fiber array connector 10 in accordance with the present invention. As illustrated, the connector 10 comprises a housing 11, alignment chips 14, alignment pins 16, and ferrules 18.

As illustrated in FIGS. 1 and 2, the housing 11 includes generally parallel ribs 12 on opposing inner sides thereof. The generally parallel ribs 12 preferably have a cross-sectional shape of a truncated cone or a modified V-shape. The ribs 12 are defined by opposite tapering walls 12b that begin at the upper or top surface 12a of each rib and extend outward until meeting the inner wall of the housing 11. The ribs 12 may be formed having shapes other than the modified v-shape shown in the Figs. Further, although two ribs 12 are shown on each side of the housing 11, other numbers of ribs 12 or none may be provided. Preferably, the housing 11 comprises a suitable plastic and is fabricated by an injection molding process.

The ribs 12 may be used in securing the alignment chips 14 within the housing 11 by aligning with parallel grooves 13 formed in a first wall of the alignment chips 14. The parallel grooves 13 have a complementary shape to the ribs 12. Alternatively, if no ribs 12 are provided on the housing 11, chips 14 may not utilize grooves 13 or the grooves 13 may be filled with adhesive to secure the alignment chips 14 to the housing 11. Formed on a second wall of the alignment chips 14, opposite of the first wall, are a plurality of generally parallel ridges 17 and grooves 15. The ridges 17 preferably have a regular spacing and extend over the length of the second wall. As will be discussed below, the ridges 17 are used to position the ferrules 18 within the connector 10. In a preferred embodiment, the alignment chips 14 are made of silicon, and the ridges 17 are formed as a truncated cone or a modified V-shape by a suitable micro-machining process, such as chemical etching. It will be appreciated that while the ridges 17 and grooves 15 are shown having truncated cone or modified v-shape, it is also possible to achieve ridges 17 and grooves 15 having other shapes.

Etching the silicon alignment chip 14 to form the ridges 17 may be performed along predetermined crystallographic angles. The ridges 17 are defined by opposite tapering walls 17b that begin at upper surface 17a of each alignment chip 14 and taper to the grooves 15. The ridges 17 are thus raised with respect to the grooves 15.

The ridges 17 may be formed by depositing a standard mask material, such as thermally grown $SiO_2$ over the major surface of the silicon alignment chip 14 (e.g., over the (100) crystallographic plane). Mask openings may be formed by standard photolithographic techniques to expose the areas of the silicon where the grooves 15 will be etched. A standard anisotropic etchant is then applied to the structure to form the grooves 15. The grooves 15 may be formed along the same crystal planes (e.g., the (111) plane). Therefore, the angle of the two sloping walls of a groove 15 (and the ridge 17) will always be precisely determined by the orientation of the crystal planes (e.g., approximately 55°) with respect to the major structure regardless of the time of etching the major surface. The size of the groove 15 will therefore primarily be determined by the size of the openings in the etch mask.

Each of the ferrules 18 contain a plurality of optical fibers 20 (e.g., 18 fibers or more) that extend rearwardly and out of the connector 10 within ribbon cables 22. The ferrules 18 are preferably formed from two like silicon members 18a and 18b that have v-grooves etched therein to position the fibers 20. It is preferable to etch v-grooves in the members 18a and 18b to ensure that the fibers are always co-linear. The members 18a and 18b have angled edges 25 that may be formed by the etching process noted above. To assemble the ferrule 18, the fibers 20 are glued in the v-grooves and the members 18a and 18b are joined by a suitable adhesive.

The angled edges 25 of the like members 18a and 18b form v-shaped grooves 23. As illustrated in FIG. 1, the v-shaped grooves 23 cooperate with the ridges 17 and grooves 15 of the alignment chips 14 to position and align the ferrules 18 within the connector 10. As illustrated in the FIGS., the width of the ridges 17 at the upper surface 17a is sized such that the grooves 23 slidably engage the ridge 17 to position the ferrules 18 within the connector. Further, because the ridges 17 are regularly spaced on the alignment chips 14, the ridges 17 that correspond to each ferrule 18 (e.g., ridges 26 and 27 that correspond to the uppermost ferrule in FIG. 2) ensure that the ferrules 18 are perpendicularly to the alignment chips 14. Such a structure provides for highly accurate positioning of the ferrules 18 within parallel planes, which provides for accurate fiber-to-fiber alignment when the connector 10 is mated to a complementary connector. This structure advantageously eliminates the requirement of alignment spacing members which are necessitated by prior art designs.

The connector alignment pins 16 are provided to accurately position the connector 10 with a complementary connector when mated thereto. The alignment pins 16 are positioned in generally parallel planes to the ferrules 18. As best shown by FIG. 3, the alignment pins 16 are preferably fabricated as a section of a cylinder since forming the pins as a complete cylinder appears unnecessary. Accordingly, edges 16a have a circular arc such that when the alignment pins 16 are joined to the alignment chips 14, contact therebetween is made only along a contact line 24. Preferably, the alignment pins are made from steel.

As best shown in FIG. 1, the alignment pins 16 extend outward from a front face of the housing 11. Thus, when the male connector 10 is mated to a complementary female connector (not shown) having a recessed area within which the alignment pins 16 may be inserted, the connectors are accurately aligned to ensure alignment of the fibers 20. Alternatively, the connectors could be hermaphroditic, where one pin 16 may protrude from the housing 11 while the other pin 16 extends over a predetermined length of the housing 11 such that a recess is formed at the front of the housing 11.

In a preferred embodiment, the connector is fabricated by aligning and bonding the alignment chips 14, alignment pins 16, and ferrules 18 together using an appropriate adhesive prior to insertion into the housing 11. After bonding, the combined structure may then be secured within the housing 11 using, e.g., ribs 12. The housing 11 thus serves to protect the internal components. Alternatively, the housing 11 may be precision fabricated such that the alignment chips 14, alignment pins 16, and ferrules 18 are aligned by, and bonded to, the housing 11. Other arrangements are possible.

The present invention may be employed in other specific forms without departing from the spirit or essential attributes thereof. For example, any number of materials may be used in manufacturing the disclosed latch member. While the invention has been described and illustrated with reference to specific embodiments, those skilled in the art will recognize that modification and variations may be made without departing from the principles of the invention as described herein above and set forth in the following claims.

What is claimed:

1. An optical connector comprising:
   alignment chips provided on opposing sides of said connector; and
   a ferrule mounted between said alignment chips,
   each of said alignment chips comprising a ridge formed on a wall thereof, and said ferrule comprising grooves provided on opposing ends thereof, said grooves cooperating with said ridges to position said ferrule within said connector.

2. The optical connector as recited in claim 1, further comprising at least one alignment pin.

3. The optical connector as recited in claim 2, further comprising a housing, wherein said alignment chips, said alignment pins and said ferrule are contained within said housing.

4. The optical connector as recited in claim 3, wherein said housing comprises generally parallel ribs and said alignment chips comprises generally parallel grooves, and wherein said parallel grooves cooperate with said generally parallel ribs to secure said alignment chips within said housing.

5. The optical connector as recited in claim 4, wherein said generally parallel ribs have a cross-sectional shape of a truncated cone.

6. The optical connector as recited in claim 1, wherein said alignment chips comprises a plurality of regularly spaced ridges, and said alignment chips are adapted to align a plurality of ferrules within said connector.

7. The optical connector as recited in claim 1, wherein said alignment chips are made of silicon and wherein said ridge is formed having a cross-sectional shape of a truncated cone.

8. The optical connector as recited in claim 1, wherein said ferrule comprises two like silicon members, each of said like members having v-grooves etched therein to position a plurality of optical fibers, and wherein said like members each having angled edges.

9. The optical connector as recited in claim 1, wherein said alignment pins position said connector with respect to a complementary connector when mated thereto.

10. The optical connector as recited in claim 9, wherein said alignment pins are positioned in planes generally parallel to said ferrule.

11. The optical connector as recited in claim 9, wherein said alignment pins are fabricated as a section of a cylinder such that edges of said alignment pins have a circular arc.

12. A multiple array optical connector comprising:
    an outer housing;
    a pair of alignment chips provided on opposing sides of said outer housing; and
    a plurality of ferrules mounted between said pair of alignment chips,
    each of said alignment chips including a plurality of regularly spaced ridges, each of said plurality of ferrules including grooves provided on opposing ends thereof, said grooves cooperating with said ridges to position said plurality of ferrules within said connector.

13. The multiple array optical connector as recited in claim 12, further comprising at least one alignment pin provided at opposing ends of said pair of alignment chips.

14. The multiple array optical connector as recited in claimed 13, wherein said housing comprises generally parallel ribs and each of said pair of alignment chips comprises generally parallel grooves, and wherein said parallel grooves cooperate with said generally parallel ribs to locate said pair alignment chips in said housing.

15. The multiple array optical connector as recited in claim 12, wherein said ridges are formed having a cross-sectional shape of a truncated cone.

16. The multiple array optical connector as recited in claim 12, wherein said plurality of ferrules each comprise two like members, each of said like members having v-grooves etched therein to position a plurality of optical fibers, and wherein said like members each have angled edges.

17. The multiple array optical connector as recited in claim 12, wherein said alignment pins are positioned in planes generally parallel to said plurality of ferrules, and wherein said alignment pins position said optical connector with respect to a complementary connector when mated thereto.

18. The multiple array optical connector as recited in claim 17, wherein said alignment pins are fabricated as a section of a cylinder such that edges of said alignment pins have a circular arc.

19. A connector for connecting multiple arrays of optical fibers arranged in generally parallel planes, said connector comprising:
    a plurality of ferrules each containing an array of optical fibers; and
    alignment chips that position said plurality of ferrules within said connector,
    said alignment chips comprising a plurality of ridges and said ferrules each comprising grooves on opposing sides thereof, said grooves cooperating with said ridges to position said ferrules within said connector.

20. The connector as recited in claim 19, further comprising alignment pins that position said connector with respect to a complementary connector.

21. The connector as recited in claim 19, wherein said ridges are formed having a cross-sectional shape of a truncated cone.

22. The connector as recited in claim 19, wherein said ferrules and said alignment chips are made of silicon, and wherein said ridges and said grooves are formed by an etching process.

23. The connector as recited in claim 19, wherein said alignment pins are positioned in planes generally parallel to said plurality of ferrules, and wherein said alignment pins position said connector with respect to a complementary connector when mated thereto.

* * * * *